United States Patent
Kim

(10) Patent No.: US 7,004,140 B2
(45) Date of Patent: Feb. 28, 2006

(54) PISTON STRUCTURE OF ENGINE

(75) Inventor: Tae-Gyun Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/749,222

(22) Filed: Dec. 30, 2003

(65) Prior Publication Data

US 2005/0081819 A1    Apr. 21, 2005

(30) Foreign Application Priority Data

Oct. 16, 2003    (KR) ...................... 10-2003-0072097

(51) Int. Cl.
*F02B 3/00* (2006.01)
(52) U.S. Cl. .................................................. 123/193.6
(58) Field of Classification Search ............. 123/193.6, 123/659–661, 193.4, 279; 92/181 R, 181 P; 29/888.041
See application file for complete search history.

(56) References Cited

U.S. PATENT DOCUMENTS

| | | | | |
|---|---|---|---|---|
| 1,759,161 A | * | 5/1930 | Lang ........................... | 123/275 |
| 4,572,123 A | * | 2/1986 | Evans ........................ | 123/262 |
| 4,858,566 A | * | 8/1989 | Paul et al. ................ | 123/41.35 |
| 5,819,700 A | * | 10/1998 | Ueda et al. ................. | 123/262 |
| 6,659,063 B1 | * | 12/2003 | Nomura et al. .......... | 123/193.6 |

FOREIGN PATENT DOCUMENTS

| JP | 5-57338 | 3/1993 |
|---|---|---|
| JP | 11-229881 | 8/1999 |

* cited by examiner

*Primary Examiner*—Marguerite McMahon
(74) *Attorney, Agent, or Firm*—Morgan Lewis & Bockius LLP

(57) ABSTRACT

A piston structure of an engine generates an automatic flow of gas through a hole penetrating from a bowl of the piston toward a lateral side of the piston. The structure provides a reinforcement of the compression and swirling movement in the combustion chamber of an engine, improvement of the mixture function of the fuel and air, reduction of the blowby leaking into the crankcase through the clearance between the cylinder wall and the piston, and prevention of the wear and tear of the cylinder liner and piston by eliminating wet fuel formed on the cylinder wall.

6 Claims, 2 Drawing Sheets

PISTON STRUCTURE OF ENGINE

CROSS-REFERENCE TO RELATED APPLICATIONS

This application claims priority of Korean Application No. 10-2003-0072097, filed on Oct. 16, 2003, the disclosure of which is incorporated fully herein by reference.

FIELD OF THE INVENTION

The present invention relates to a piston structure of an engine adapted to change gas movement of the combustion chamber to thereby improve the engine function.

BACKGROUND OF THE INVENTION

Generally, engine performance is largely affected by the flow of gas in the combustion chamber of the engine. In order for the engine to operate effectively, the fuel and air should be mixed efficiently and homogeneously, and blowby through the piston clearance between the cylinder wall and the piston should be minimized.

While these basic operating parameters have always been known, prior art pistons have only achieved varying degrees of success in advantageously combining these parameters.

SUMMARY OF THE INVENTION

Embodiments of the present invention provide a piston structure of an engine adapted to reinforce the compression and swirling gas movement in the combustion chamber, thereby improving a mixture function of the fuel and air, reducing the amount of blowby leaking into the crankcase through the clearance between the cylinder wall and the piston, and preventing wear and tear of the cylinder liner and piston by effectively removing the wet fuel from the cylinder wall.

In a preferred embodiment of the present invention, the piston structure of an engine according to the present invention comprises a plurality of through holes passing through from a bowl of an upper side of the piston to a lateral side of the piston. The through hole is further shaped in a linear passage upwardly slanted from the bowl toward the top land of the piston. The diameter of the bowl side of the through hole is larger than that of the lateral side of the piston, and the through hole gets linearly smaller in diameter as it approaches from the bowl to the lateral side of the piston.

In a further embodiment of the present invention, a piston structure comprises a piston head with top and lateral side surfaces. A bowl is formed in the top side surface, and a plurality of holes are formed through the piston head extending from a lower region in the bowl upwardly and outwardly to open at the lateral side surface of the piston head. The plurality of holes have a first opening cross-section in the bowl, and gradually decrease in cross-section to a second, smaller cross section exiting on the lateral side.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

The preferred embodiment of the present invention will now be described in detail with reference to the accompanying drawings.

Figure 1:
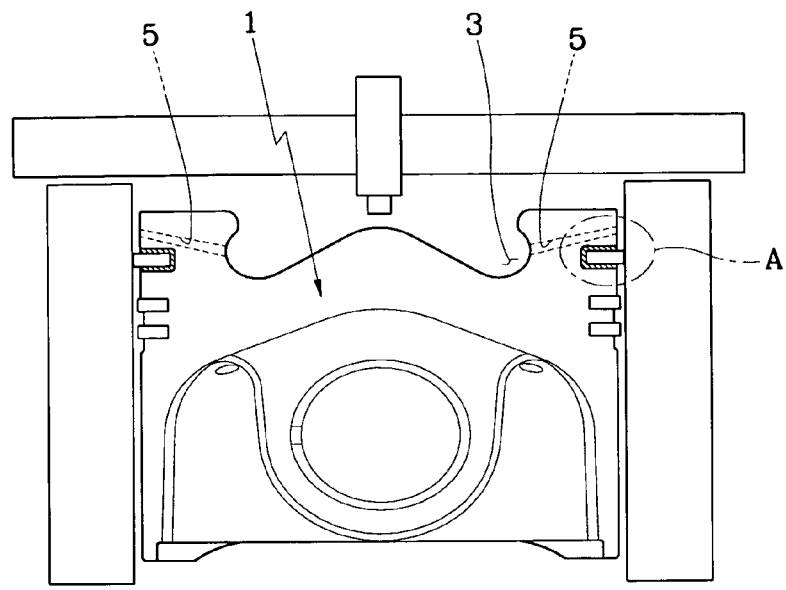
FIG. 1 is a cross-sectional view of a piston structure of an engine according to an embodiment of the present invention.

As shown in FIG. 1, the piston structure of an engine according to an embodiment of the present invention comprises a plurality of through holes 5 penetrating from a bowl 3 on the upper side of the piston 1 to a lateral side of the piston 1. The through hole 5 may be a linear passage slanted upwardly from the bowl 3 to the top land of the piston 1. The passage may also be formed in a curved-shape as long as it is upwardly configured from the bowl 3 to a lateral side of the piston 1.

The diameter of the through hole 5 is larger at the bowl 3 side than the lateral side of the piston 1. Through hole 5 preferably gets linearly smaller in diameter as it approaches from the bowl 3 toward the lateral side of the piston 1. With the diminished cross-section in the outward direction, gas taken from the bowl 3 side can be injected more quickly to the lateral side of the piston 1.

When the piston 1 moves up the cylinder toward top dead center (TDC) during a compression stroke, the gas compressed into the bowl 3 moves through the through hole 5.

Figure 2:
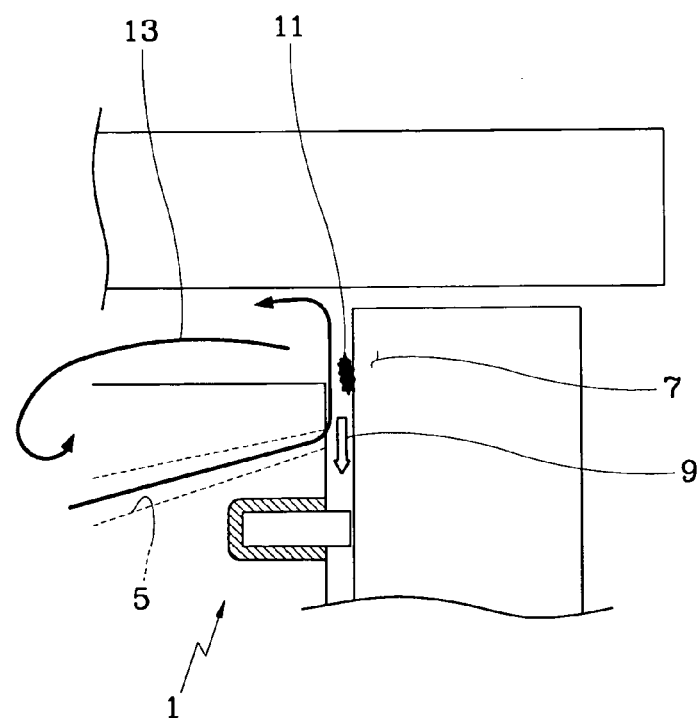
FIG. 2 is a detailed view of the A part of FIG. 1, illustrating the flow of gas through a through hole.

As shown in FIG. 2, the gas moving from the bowl 3 side through the through hole 5 to the lateral side of the piston 1 runs into a cylinder wall 7 between the cylinder wall 7 and the piston 1 and changes its toward a central portion of the bowl 3 of the combustion chamber. The gas thus recirculated removes wet fuel 11 from the cylinder wall 7 to the center of the combustion chamber. This, however, can be more effectively implemented by a fast injection of the gas from the bowl 3 side of the through hole 5 toward the lateral side of the piston 1. Removing the wet fuel 11 from the cylinder wall 7 prevents carbon from accumulating between the cylinder wall 7 and the piston 1, thereby restricting polishing and scuffing of the cylinder wall 7 and the piston 1 due to carbon buildup.

After gas flows through the through hole 5, the gas flows in an opposite direction to that of the blowby 9, which leaks into the crankcase through the clearance between the cylinder wall 7 and piston 1. Thus the amount of blowby 9 can also be reduced. If the amount of blowby is reduced, contamination of the engine oil and crankcase are also greatly reduced, in addition to air-pollution.

While the piston 1 moves up the cylinder toward the TDC, the fast flow of the gas passing through the through hole 5 reinforces the compression and swirling movement 13 generated between the top land portion of the piston 1 and the upper side of the combustion chamber. Further, the enhanced gas movement 13 improves the blending function of the fuel and air and the combustion function of the engine as well.

Figure 3:
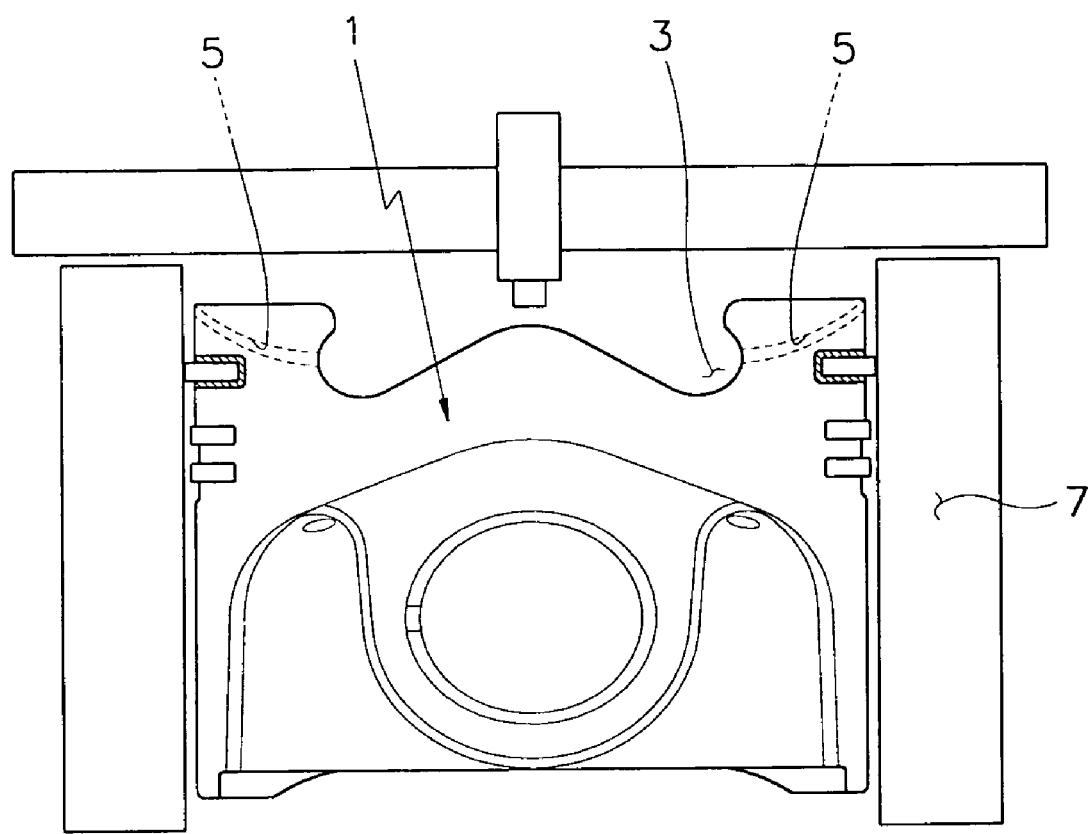
FIG. 3 illustrates a piston structure of an engine according to another embodiment of the present invention.

In an alternative embodiment of the present invention, the through hole 5, as shown in FIG. 3, can be shaped in a curved passage rapidly upwardly formed from the bowl 3 toward the top land of the piston 1. The through hole 5 shaped in a curved passage thus described also has the similar effect with that of the first embodiment of the present invention.

As apparent from the foregoing, there is an advantage in the piston structure of an engine in that the structure renders an automatic gas flow through a through hole penetrating from the bowl of the piston toward the lateral side of the piston, thereby reinforcing the squishing movement in the combustion chamber of the engine, improving the mixture function of the fuel and air, reducing the blowby leaking into the crankcase through the clearance between the cylinder wall and the piston, and preventing the wear of the cylinder liner and piston by effectively removing fuel wetted on the cylinder wall.

What is claimed is:

1. A piston structure of an engine, comprising a plurality of through holes passing through from a bowl in an upper side of a piston to a lateral side of said piston, wherein said through hole has a larger diameter at said bowl side and said through hole gets linearly smaller in diameter from said bowl to the lateral side of said piston.

2. The structure as defined in claim 1, wherein said through hole is shaped as a linear passage upwardly slanted from said bowl toward a top land of said piston.

3. The structure as defined in claim 1, wherein said through hole is shaped as a curved passage, upwardly formed from said bowl toward a top land of said piston.

4. A piston structure, comprising:
a piston head with top and lateral side surfaces;
a bowl formed in the top side surface; and
a plurality of holes formed through the piston head extending from a lower region in said bowl upwardly and outwardly to open at the lateral side surface of the piston head, wherein said plurality of holes have a first opening cross-section in said bowl and gradually decrease in cross-section to a second smaller cross section exiting on said lateral side.

5. A piston structure of an engine, comprising a plurality of through holes passing through from a bowl in an upper side of a piston to a lateral side of said piston, wherein said through hole is shaped as a linear passage upwardly slanted from said bowl toward a top land of said piston, wherein said through hole has a lager diameter at said bowl side and said through hole gets linearly smaller in diameter from said bowl to the lateral side of said piston.

6. The structure as defined in claim 5, wherein said through hole is shaped as a curved passage, upwardly formed from said bowl toward a top land of said piston.

* * * * *